United States Patent
Resconi et al.

(10) Patent No.: US 11,299,610 B2
(45) Date of Patent: Apr. 12, 2022

(54) HETEROPHASIC COPOLYMER

(71) Applicant: BOREALIS AG, Vienna (AT)

(72) Inventors: Luigi Resconi, Ferrara (IT); Wilfried Toltsch, Marchtrenk (AT); Jingbo Wang, Linz (AT); Markus Gahleitner, Neuhofen/Krems (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/904,150

(22) PCT Filed: Jul. 10, 2014

(86) PCT No.: PCT/EP2014/064845
§ 371 (c)(1),
(2) Date: Jan. 11, 2016

(87) PCT Pub. No.: WO2015/004251
PCT Pub. Date: Jan. 15, 2015

(65) Prior Publication Data
US 2016/0152810 A1 Jun. 2, 2016

(30) Foreign Application Priority Data

Jul. 12, 2013 (EP) .................................. 13176366

(51) Int. Cl.
*C08L 23/10* (2006.01)
*C08L 23/14* (2006.01)
*C08L 23/16* (2006.01)
*C08F 4/659* (2006.01)

(52) U.S. Cl.
CPC ............ *C08L 23/10* (2013.01); *C08L 23/14* (2013.01); *C08L 23/16* (2013.01); *C08F 4/65912* (2013.01); *C08L 2207/02* (2013.01)

(58) Field of Classification Search
CPC ..................................................... C08L 23/10
See application file for complete search history.

(56) References Cited

U.S. PATENT DOCUMENTS

| | | | |
|---|---|---|---|
| 5,753,773 A | 5/1998 | Langhauser et al. | |
| 8,426,520 B2 * | 4/2013 | Nenseth | C08F 210/16 525/191 |
| 8,569,412 B2 * | 10/2013 | Posch | C08L 23/10 524/427 |
| 8,822,602 B2 * | 9/2014 | Leskinen | C08F 110/06 525/199 |
| 9,273,167 B2 * | 3/2016 | Sandholzer | C08F 210/06 |
| 9,416,262 B2 * | 8/2016 | Kock | C08L 23/14 |
| 9,611,382 B2 * | 4/2017 | Kock | C08F 291/18 |
| 2007/0117932 A1 * | 5/2007 | De Palo | B32B 1/08 525/240 |
| 2010/0016510 A1 * | 1/2010 | Malm | C08F 10/00 525/240 |
| 2010/0280166 A1 * | 11/2010 | Nenseth | C08F 210/16 524/528 |
| 2010/0280181 A1 * | 11/2010 | Nenseth | C08L 23/10 525/209 |
| 2011/0034634 A1 * | 2/2011 | Grein | C08F 210/06 525/240 |
| 2012/0214947 A1 * | 8/2012 | Klimke | C08L 23/10 525/240 |

FOREIGN PATENT DOCUMENTS

| | | |
|---|---|---|
| EP | 1236769 | 9/2002 |
| EP | 1681315 | 7/2006 |
| EP | 1801156 | 6/2007 |
| EP | 2053086 | 4/2009 |
| EP | 2072546 | 6/2009 |
| EP | 2174980 | * 4/2010 |
| JP | 2008081644 | 10/2008 |
| WO | 2003037981 | 5/2003 |
| WO | 2006097497 | 9/2006 |
| WO | 2007116034 | 10/2007 |
| WO | 2009054832 | 4/2009 |
| WO | WO20100149529 | * 12/2010 |
| WO | WO2011050926 | * 5/2011 |
| WO | 2011135004 | 11/2011 |
| WO | 2011135005 | 11/2011 |
| WO | WO2012016965 | * 2/2012 |
| WO | WO2012062734 | * 5/2012 |
| WO | 2013007650 | 1/2013 |
| WO | 2013007664 | 1/2013 |

OTHER PUBLICATIONS

International Search Report and Written Opinion for PCT/EP2014/064845 dated Aug. 25, 2014.

* cited by examiner

*Primary Examiner* — Irina Krylova
(74) *Attorney, Agent, or Firm* — Thomas | Horstemeyer LLP

(57) ABSTRACT

A heterophasic propylene ethylene copolymer having an $MFR_2$ of 0.5 to 100 g/10 min and obtained using single site catalysis comprising: (i) at least 40 wt % of a propylene homopolymer or propylene ethylene copolymer matrix having up to 4 wt % comonomer; (ii) at least 10 wt % of an ethylene propylene rubber dispersed in the matrix, said heterophasic propylene ethylene copolymer having a xylene cold soluble content (XS) of 12 to 60%; wherein the ethylene content of the xylene cold soluble fraction of said heterophasic propylene ethylene copolymer is between 18 and 70 wt. %; and wherein the intrinsic viscosity of the XS fraction of said heterophasic propylene ethylene copolymer is greater than the intrinsic viscosity of the matrix fraction of said copolymer.

6 Claims, No Drawings

HETEROPHASIC COPOLYMER

This invention relates to a heterophasic propylene ethylene copolymer and to a process for the polymerisation of propylene and ethylene using a bridged bis indenyl π-catalyst to form said polymer. In particular, the invention relates to heterophasic propylene ethylene copolymers with excellent impact strength, and good toughness achieved in polymers which can be used across a broad temperature range. The use of catalysts which comprise certain bridged bis indenyl complexes in solid form but free of an external carrier to polymerise ethylene and propylene to form the heterophasic copolymers of the invention is further provided.

The glass transition temperature of crystalline isotactic polypropylene (iPP) of around 0° C. limits the applicability of all iPP-based materials in the sub-zero temperature range. Combining iPP as a matrix phase with an elastomeric component having a sufficiently low glass transition temperature (Tg) is a standard approach for overcoming this problem. Even then, however, the performance at temperatures below around −10° C. is often limited.

Conventional heterophasic polypropylene polymers are based on a matrix phase and an amorphous C3/C2 phase and are typically produced with heterogeneous Ziegler Natta catalysis. These polymers however, suffer from a number of design problems.

One problem is the dispersion of the elastomeric component in the matrix, due in part to the particle size of the elastomeric phase. Problems can also arise due to the viscosity ratio between elastomeric component and matrix (PP) phase, and the compatibility between these two phases. Incompatibility is a result of the compositional differences between the materials. Good compatibility is often achieved at high propylene (C3) content (and hence low ethylene (C2) content) in the rubber phase which, however, leads to a higher Tg, again limiting the performance at very low temperatures, such as below −10° C.

Attempts to increase the elastomer content (i.e. the EPR phase) to thereby improve impact strength will necessarily reduce the stiffness or tensile modulus of the polymer. Also, increasing the ethylene content inevitably reduces the heat resistance of the polymer.

The C3/C2-ratio in the disperse elastomer phase therefore defines both the glass transition point Tg of the ethylene propylene rubber (EPR) phase and the compatibility with the matrix component, the latter co-defining the particle size.

The inventors have also found that a certain molecular weight limit (frequently expressed as intrinsic viscosity (IV(EPR)) has to be overcome for the elastomer phase to effectively increase the impact strength, whilst too high molecular weight will both reduce the overall flowability of the composition and again increase the particle size.

The present inventors sought the production of relatively high flow heterophasic copolymers having $MFR_2$ values of at least 0.5 g/10 min. At these high flow values, there are issues with property balance, e.g. in terms of impact strength and toughness. This invention offers heterophasic copolymers with an excellent balance of properties in terms of toughness and impact strength at high flow. These properties are achieved at commercially relevant glass transition temperatures Tg.

Similar polymers to those of claim 1 are known in the art. In EP-A-1,511,803, heterophasic copolymers are disclosed with high flow but with low ethylene content in both the polymer and the EPR phase thereof.

U.S. Pat. No. 5,753,773 describes single site catalyst-based polymers with a polypropylene homo- or copolymer matrix component and a comonomer content of 5-98 wt % in the EPR phase, the polymers having a melting point ≤155° C. The flow of the polymers is not discussed.

EP-A-2,053,086 generally describes Ziegler Natta based heterophasic copolymers with a 60-90 wt % of the matrix component and 10-40 wt % EPR component. C2 contents within the EPR phase are generally low.

EP-A-2,072,546 teaches heterophasic copolymers with good impact strength which are generally based on high amounts of the matrix phase. It exemplifies a polymer with only 16.6 wt % of xylene insoluble fraction but with comparatively low stiffness.

WO2013/007650 and WO2013/007664 also describe heterophasic polypropylene resins comprising a propylene homopolymer matrix and an ethylene-propylene copolymer phase dispersed within the matrix with excellent low temperature impact properties. The polymers disclosed are however of low flow and the viscosity of the EPR phase is always lower than the matrix.

EP-A-1681315 describes a heterophasic polymer composition comprising a bimodal propylene copolymer matrix, in combination with a rubber, in which the rubber is preferably a propylene/ethylene copolymer. The polymer is produced using Ziegler Natta catalysis. Furthermore, EP-A-1681315 is silent on the requirement that IV(XS)>IV(XI) as is required for compositions of the present invention. Inventive examples are given in EP-A-1681315 in which the opposite is true.

The present inventors sought polymers with high flow and good impact properties without losing toughness.

In order to prepare the copolymers of the invention, the use of single site catalysis is required. The inventors have found that the process and catalysts described herein are ideal for the production of heterophasic propylene/ethylene copolymers as defined herein. This can be achieved with high productivity and high catalyst activity.

As we note below, the catalysts used in the polymer manufacture are not themselves new and other similar catalysts are known. WO2009/054832 discloses conventionally supported metallocene catalysts which are branched at the 2-position of the cyclopentadienyl ring in at least one of the ligands making up the catalyst.

WO2007/116034 describes metallocene compounds substituted in the 2-position by a linear alkyl group. In particular the compound dimethylsilyl(2-methyl-4-phenyl-5-methoxy-6-tertbutylinden-1-yl dichlorozirconium is described which carries a methyl group at the 2-position.

WO2006/097497 describes certain symmetrical metallocenes based on tricyclic ring systems (tetrahydroindacenyl).

WO2011/135004 and WO2011/135005 describe rac-$Me_2Si(2$-Me-4-Ph-5-OMe-6-tBuInd$)_2ZrCl_2$ but only in the context of propylene homopolymerization.

The complexes used in the process of the invention are however described in the WO2013/007650 and suggested for propylene ethylene copolymerisation. However, their use explicitly in the production of the propylene ethylene copolymers as herein described is not known.

It has now surprisingly been found that the particular complexes described below in solid form but free from external carrier can be used in propylene ethylene polymerisation with excellent results. They enable the formation of the heterophasic propylene ethylene copolymers described herein.

SUMMARY OF INVENTION

Thus, viewed from one aspect the invention provides a heterophasic propylene ethylene copolymer having an $MFR_2$ of 0.5 to 100 g/10 min and obtained using single site catalysis comprising:

(i) at least 40 wt % of a propylene homopolymer or propylene ethylene copolymer matrix having up to 4 wt % ethylene; and (ii) at least 10 wt % of an ethylene propylene rubber (EPR) dispersed in the matrix;

said heterophasic propylene ethylene copolymer having a xylene cold soluble content (XS) of 12 to 60%;

wherein the ethylene content of the xylene cold soluble fraction of said heterophasic propylene ethylene copolymer is between 18 and 70 wt. %; and wherein the intrinsic viscosity of the xylene cold soluble fraction of said heterophasic propylene ethylene copolymer is greater than the intrinsic viscosity of the xylene cold insoluble fraction of said copolymer.

Viewed from another aspect the invention provides a heterophasic propylene ethylene copolymer having an $MFR_2$ of 0.5 to 100 g/10 min and obtained using single site catalysis comprising:

(i) at least 40 wt % of a propylene homopolymer or propylene ethylene copolymer matrix having up to 4 wt % comonomer;

(ii) at least 10 wt % of an ethylene propylene rubber dispersed in the matrix, said heterophasic propylene ethylene copolymer having a xylene cold soluble content (XS) of 12 to 60%;

wherein the ethylene content of the xylene cold soluble fraction of said heterophasic propylene ethylene copolymer is between 18 and 70 wt. %; and wherein the intrinsic viscosity of the XS fraction of said heterophasic propylene ethylene copolymer is greater than the intrinsic viscosity of the matrix fraction of said copolymer.

Viewed from another aspect the invention provides a process for the preparation of a heterophasic propylene ethylene copolymer as hereinbefore defined comprising polymerising:

(I) propylene and optionally ethylene so as to form at least 40 wt % of a propylene homopolymer or propylene ethylene copolymer matrix having up to 4 wt % ethylene as said matrix component; and subsequently polymerising (II) propylene and ethylene, preferably in the gas phase, so as to form at least 10 wt % of an ethylene propylene rubber dispersed in the matrix;

wherein both steps (I) and (II) take place in the presence of the same single site solid particulate catalyst free from an external carrier, preferably a catalyst comprising (i) a complex of formula (I):

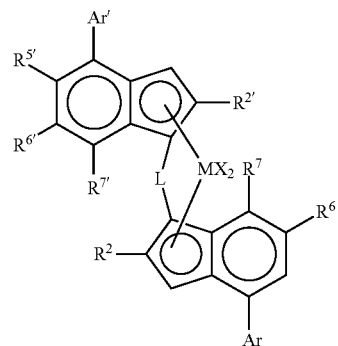

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$ hydrocarbyl radical optionally containing one or more heteroatoms from groups 14-16;
$R^{5'}$ is a $C_{1-20}$ hydrocarbyl group containing one or more heteroatoms from groups 14-16 optionally substituted by one or more halo atoms;
$R^6$ and $R^{6'}$ are each independently hydrogen or a $C_{1-20}$ hydrocarbyl group optionally containing one or more heteroatoms from groups 14-16;
$R^7$ and $R^{7'}$ are each independently hydrogen or $C_{1-20}$ hydrocarbyl group optionally containing one or more heteroatoms from groups 14-16;
Ar is independently an aryl or heteroaryl group having up to 20 carbon atoms optionally substituted by one or more groups $R^1$;
Ar' is independently an aryl or heteroaryl group having up to 20 carbon atoms optionally substituted by one or more groups $R^1$;
each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;
each $R^4$ is a $C_{1-20}$ hydrocarbyl group;
and (ii) a cocatalyst comprising a compound of a group 13 metal, e.g. Al or boron compound.

The catalyst used in the process of the invention is in solid particulate form free from an external carrier. Ideally, the catalyst is obtainable by a process in which (a) a liquid/liquid emulsion system is formed, said liquid/liquid emulsion system comprising a solution of the catalyst components (i) and (ii) dispersed in a solvent so as to form dispersed droplets; and (b) solid particles are formed by solidifying said dispersed droplets.

Viewed from another aspect therefore, the invention provides a process for the preparation of an propylene ethylene copolymer as hereinbefore defined in which the catalyst as hereinbefore defined is prepared by obtaining (i) a complex of formula (I) and a cocatalyst (ii) as hereinbefore described;
forming a liquid/liquid emulsion system, which comprises a solution of catalyst components (i) and (ii) dispersed in a solvent, and solidifying said dispersed droplets to form solid particles.

Viewed from another aspect the invention provides an article such as a film comprising the heterophasic propylene ethylene copolymer as hereinbefore defined.

Viewed from another aspect the invention provides the use of a heterophasic propylene ethylene copolymer as hereinbefore defined in the manufacture of an article.

Definitions

Throughout the description the following definitions are employed.

References to xylene solubility are always based on xylene cold solubility at 23° C. The test for this parameter is given at the end of the description.

By free from an external carrier is meant that the catalyst does not contain an external support, such as an inorganic support, for example, silica or alumina, or an organic polymeric support material.

The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl.

Unless otherwise stated, preferred $C_{1-20}$ hydrocarbyl groups are $C_{1-20}$ alkyl, $C_{4-20}$ cycloalkyl, $C_{5-20}$ cycloalkylalkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tertbutyl, isobutyl, $C_{5-6}$-cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

Catalyst activity is defined in this application to be the amount of polymer produced/g catalyst/h. The term productivity is also sometimes used to indicate the catalyst activity although herein it designates the amount of polymer produced per unit weight of catalyst.

DETAILED DESCRIPTION OF INVENTION

This invention relates to a heterophasic propylene ethylene copolymer made using single site catalysis. Through the use of single site catalysis, the nature of the EPR component can be tailored to achieve surprisingly good impact strength at both ambient and low temperatures at high melt flow rates. Also, we show that the copolymers of the invention possess a low brittle-to-ductile transition temperature achieved therefore with an EPR content of more than 10 wt %.

The intrinsic viscosity ratio between xylene soluble component and matrix phase is ideally above 1 and the best impact strength values are achieved where the ethylene content of the XS component is in the range of 18 to 70 wt %.

Surprisingly, the inventors have found that the good toughness is not limited to a narrow composition range of the EPR phase. Consequently, other targets like particle size reduction for improving the optical performance can be achieved at low C2(XS), and good stress whitening resistance can be achieved at high C2(XS). In the whole range, the stiffness remains relatively high, and good emission values can be expected.

The polymers of the invention comprise a matrix component and an amorphous ethylene propylene rubber component.

Matrix Phase/Component

The matrix component (also known as the matrix phase) is a propylene homopolymer or propylene ethylene copolymer. The ethylene content in this component is low, 4 wt % or less, preferably 3 wt % or less, more preferably 2 wt % or less, ideally 1.5 wt % or less. Even more preferably there is less than 1 wt % ethylene in the matrix component, such as 0.5 wt % or less. It is therefore preferred if the ethylene content of the xylene insoluble fraction is 4 wt % or less, preferably 3 wt % or less, such as 2 wt % or less, ideally 1.5 wt % or less. Even more preferably there is less than 1 wt % ethylene in the xylene insoluble fraction (C2(XI)<1 wt %), such as less than 0.5 wt % (C2(XI)<0.5 wt %).

The $MFR_2$ of this matrix component may be in the range of 10 to 150 g/10 min, such 20 to 100 g/10 min, preferably 25 to 90 g/10 min.

It is preferred if the matrix component is a homopolymer, i.e. it contains propylene repeating units only.

There can be up to 90 wt % of this component in the polymer of the invention, such as up to 80 wt %. Ideally there is 40 to 90 wt % of the matrix component, such as 50 to 90 wt % in the heterophasic copolymer as a whole. In a further embodiment, the matrix component might form 88 to 40 wt %, such as 88 to 50 wt % of the heterophasic copolymer. The matrix fraction of the polymer as a whole is preferably in the range of 87 to 55 wt %, such as 76 to 55 wt %.

The glass transition temperature of the polypropylene matrix component is preferably in the range of 10 to –10° C., e.g. 5 to –5° C.

It is preferred if the matrix phase is at least partially crystalline thus ensuring that the polymer as a whole comprises a crystalline phase and an amorphous phase.

The matrix component is ideally an isotactic propylene matrix component. The matrix component may consist of a single propylene homopolymer but may also comprise a mixture of different propylene homopolymers. Ideally, however a single propylene homopolymer is present.

EPR Phase/Component

Component (II) is an ethylene propylene rubber (EPR). This component may have an excess of ethylene or an excess of propylene. There should be no other comonomers present in the EPR phase. This component forms at least 10 wt % of the heterophasic copolymer as a whole, such as at least 12 wt %, more preferably at least 13 wt % of the polymer. It should form no more than 60 wt % of the polymer such as no more than 50 wt % of the heterophasic polymer.

It is thus preferred if the EPR fraction of the polymer as a whole is 10 to 60 wt %, such as 12 to 50 wt %. The EPR fraction of the polymer as a whole is preferably in the range of 13 to 45 wt %, even more preferably in the range of 24 to 45 wt %.

Thus, viewed from another aspect the invention provides a heterophasic propylene ethylene copolymer having an $MFR_2$ of 0.5 to 100 g/10 min and obtained using single site catalysis comprising:
  (i) 40 to 90 wt % of a propylene homopolymer or propylene ethylene copolymer matrix having up to 4 wt % ethylene; and
  (ii) 10 to 60 wt % of an ethylene propylene rubber (EPR) dispersed in the matrix;

said heterophasic propylene ethylene copolymer having a xylene cold soluble content (XS) of 12 to 60%;
wherein the ethylene content of the xylene cold soluble fraction of said heterophasic propylene ethylene copolymer is between 18 and 70 wt. %; and
wherein the intrinsic viscosity of the xylene cold soluble fraction of said heterophasic propylene ethylene copolymer is greater than the intrinsic viscosity of the xylene cold insoluble fraction of said copolymer.

The ethylene content of the xylene soluble fraction, (C2(XS)) is between 18 and 70 wt %, preferably 20 to 67 wt %.

It has been found that the properties of the polymer of the invention, especially the impact strength are improved at higher ethylene contents. This is achieved however, without damaging other critical properties of the polymer.

Alternatively viewed, the ethylene content of the EPR phase may be 18 to 70 wt %, such as 20 to 67 wt %.

The EPR phase is generally a random copolymer. It is preferably dispersed within the matrix phase and that is best achieved by producing the EPR phase after the matrix phase in a multistage polymerisation reaction as defined further below.

The glass transition temperature of the matrix phase may be in the range of −30 to −60° C., such as −35 to −55° C.

The $MFR_2$ of the xylene soluble component is preferably more than 0.01 g/10 min, preferably more than 0.05 g/10 min, more preferably more than 0.1 g/10 min, especially more than 0.2 g/10 min. The upper limit or the $MFR_2$ of the xylene soluble component is preferably 10 g/10 min.

If the MFR values of a component cannot be measured directly, they can be calculated from intrinsic viscosity measurements based on the correlations defined in C. Grein, M. Gahleitner, B. Knogler & S. Nestelberger, *Melt viscosity effects in Ethylene-Propylene Copolymers*, Rheol.Acta, 46 (2007) 1083-1089. From the MFR of the total polymer and the MFR of the XS fraction (sometimes called the XCS fraction), the MFR of the matrix component of an impact copolymer can be calculated using a logarithmic mixing rule, i.e. using the following equation $$MFR(\text{Total}) = 10^{(1-w(EPR))\log 10(MFR(Matrix)) + w(EPR)\log 10(MFR(XCS))}$$

with w(EPR) being the weight fraction of the elastomeric phase, approximated by the weight fraction of the XS component.

Polymer properties

The polymer of the invention is a heterophasic ethylene/propylene copolymer. By heterophasic is meant that the polymer contains both a crystalline portion and an amorphous portion. It must be made using a single site catalyst material, e.g. one as herein defined.

The polymer as a whole has a xylene soluble (XS) fraction of 12 to 60 wt %, such as 12 to 50 wt %. The xylene soluble portion of the polymer as a whole is preferably in the range of 13 to 45 wt %, even more preferably in the range of 24 to 45 wt %.

It is also a preferred feature of claim 1 that the intrinsic viscosity (IV) of the XS portion of the polymer as a whole is greater than the intrinsic viscosity (IV) of the xylene insoluble portion as a whole (IV(XI)). The difference may be 0.01 dl/g or more, e.g. 0.05 dl/g or more such as 0.1 dl/g or more.

Intrinsic viscosity is a measure of molecular weight and thus the XS portion of the polymer as a whole can be considered to have a higher Mw (weight average molecular weight) than that of the xylene insoluble portion.

Alternatively viewed, the intrinsic viscosity (IV) of the XS portion of the polymer as a whole is greater than the intrinsic viscosity (IV) of the matrix component.

Alternatively viewed, the IV of the EPR phase is preferably greater than the IV of the matrix phase.

The value of the IV of the XS phase divided by the IV of the xylene insoluble phase (XI) is preferably more than 1 to 5, such as IV(XS)/IV(XI) 1.2 to 4, preferably 1.2 to 3.0.

Alternatively viewed, the IV of the XS portion of the polymer as a whole/the IV of the matrix phase is 1 to 5, such as 1.2 to 4 dl/g, especially IV(XS)/IV(M) of 1.2 to 3.0.

Alternatively viewed, the IV of the EPR portion of the polymer/the IV of the matrix phase is 1 to 5, such as IV(EPR)/IV(M) 1.2 to 4, preferably 1.2 to 3.0.

The actual IV of the EPR phase or the actual IV of the XS fraction may be in the range of 1 to 5 dl/g, such as 1 to 4 dl/g, preferably 1.5 to 3.5 dl/g, especially 1.6 to 3.2 dl/g.

Preferably, where the intrinsic viscosity of the xylene soluble fraction of said heterophasic propylene ethylene copolymer is greater than the intrinsic viscosity of the xylene insoluble fraction of said copolymer that the difference is at least 0.2 dl/g, such as at least 0.5 dl/g.

Preferably, where the intrinsic viscosity of the xylene soluble fraction of said heterophasic propylene ethylene copolymer is greater than the intrinsic viscosity of the matrix component of said copolymer that the difference is at least 0.2 dl/g, such as at least 0.5 dl/g.

Preferably, where the intrinsic viscosity of the EPR fraction of said heterophasic propylene ethylene copolymer is greater than the intrinsic viscosity of the matrix fraction of said copolymer that the difference is at least 0.2 dl/g, such as at least 0.5 dl/g.

The IV of the matrix phase or the IV of the xylene insoluble fraction is typically in the range of 0.5 to 3, such as 1 to 2 dl/g and is lower than that of the EPR phase or XS portion.

The IV of the polymer as a whole may be 0.9 to 3 dl/g, preferably in the range of 1.0 to 2.5 dl/g.

It is preferred if the overall $MFR_2$ of the copolymer of the invention is in the range from 0.5 to 100 g/10 min, preferably 0.7 to 60 g/10 min, more preferably 2 to 50 g/10 min, especially 4 to 35 g/10 min.

The ethylene content of the polymer as a whole may be in the range of 2 to 30 wt %, such as 3 to 25 wt %.

The tensile modulus of the heterophasic polymers of the invention may be at least 800 MPa, such as at least 900 MPa.

It is a feature of the invention that impact properties of the heterophasic polymer are excellent. The impact properties, as measured by charpy instrumented impact strength at 23° C. are preferably 7 $kJ/m^2$ or more, such as 10 $kJ/m^2$ or more, especially 15 $kJ/m^2$ of more. At −19° C. the values are 4 $kJ/m^2$ or more, such as 5 $kJ/m^2$ or more.

The polymers of the invention have excellent brittle to ductile transition temperatures (BDTT) at a temperature of 30° C. or less, such as 20° C. or less, more preferably 10° C. or less, determined from Charpy instrumented impact strength according to ISO 179-2:2000.

Catalyst

The heterophasic polymers as described herein are preferably made using certain metallocene catalysts. The complexes and hence catalysts of the invention preferably used are based on a complex of formula (I):

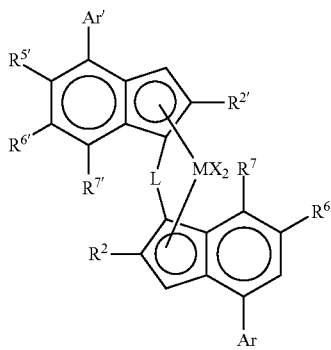

(I)

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-alkyl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms;

$R^6$ and $R^{6'}$ are each independently hydrogen or a $C_{1-20}$ hydrocarbyl group optionally containing one or more heteroatoms from groups 14-16;

$R^7$ and $R^{7'}$ are each independently hydrogen or $C_{1-20}$ hydrocarbyl group optionally containing one or more heteroatoms from groups 14-16;

Ar is independently an aryl or heteroaryl group having up to 20 carbon atoms optionally substituted by one or more groups R';

Ar' is independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;

each $R^4$ is a $C_{1-20}$ hydrocarbyl group.

Such catalysts are described in WO2013/007650 which is incorporated herein by reference. Thus, preferred complexes of use in the invention are of formula (II') or (II)

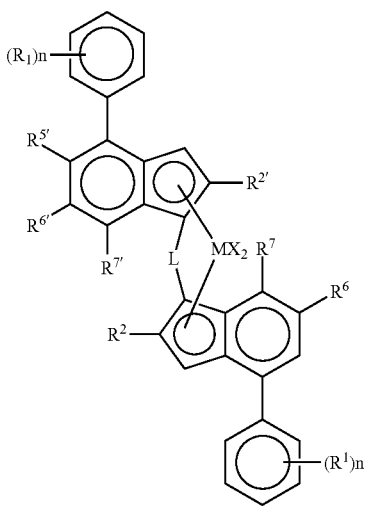

(II')

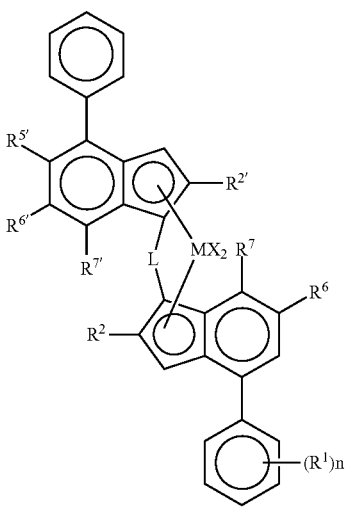

(II)

wherein

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;

each $R^2$ or $R^{2'}$ is a $C_{1-10}$ alkyl group;

$R^{5'}$ is a $C_{1-10}$ alkyl group or $Z'R^{3'}$ group;

$R^6$ is hydrogen or a $C_{1-10}$ alkyl group;

$R^{6'}$ is a $C_{1-10}$ alkyl group or $C_{6-10}$ aryl group;

$R^7$ is hydrogen, a $C_{1-6}$ alkyl group or $ZR^3$ group;

$R^{7'}$ is hydrogen or a $C_{1-10}$ alkyl group;

Z and Z' are independently O or S;

$R^{3'}$ is a $C_{1-10}$ alkyl group, or a $C_{6-10}$ aryl group optionally substituted by one or more halo groups;

$R^3$ is a $C_{1-10}$-alkyl group;

each n is independently 0 to 4, e.g. 0, 1 or 2;

and each $R^1$ is independently a $C_{1-20}$ hydrocarbyl group, e.g. $C_{1-10}$ alkyl group.

Further preferred complexes of use in the invention are of formula (III') or (III):

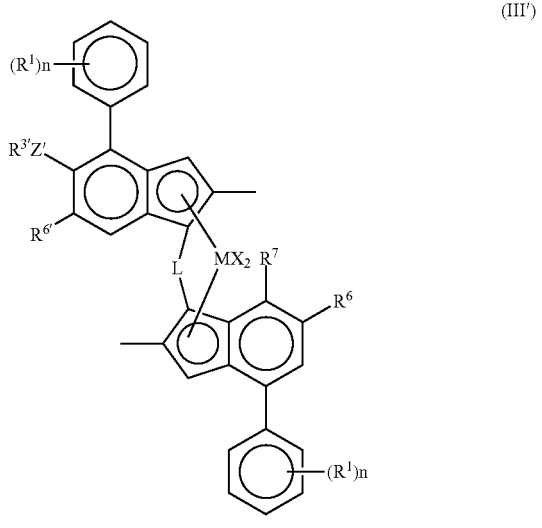

(III')

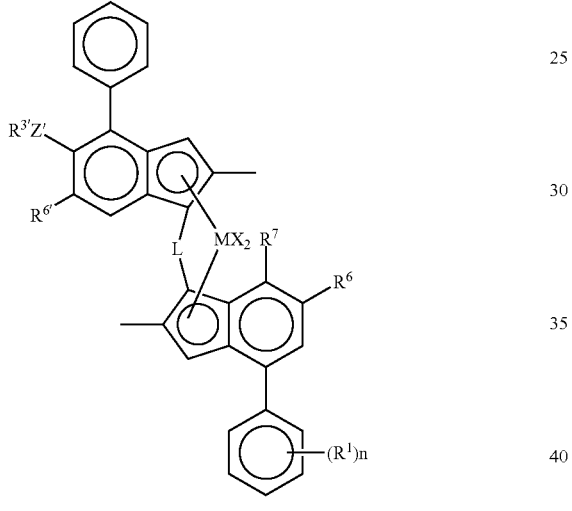

(III)

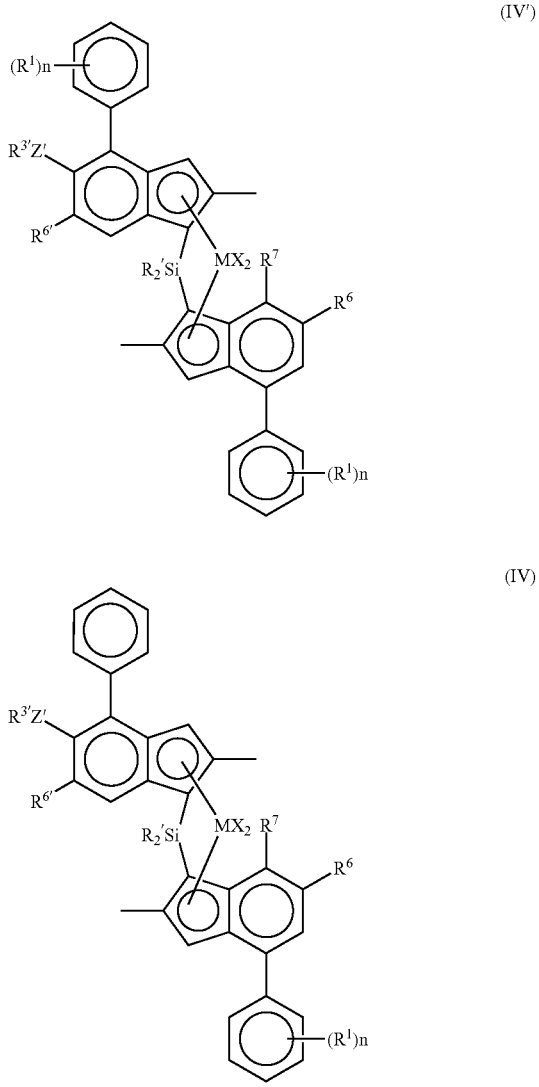

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, $C_{1-20}$ alkyl or $C_{3-10}$ cycloalkyl;

$R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0 to 4, e.g. 0, 1 or 2; and each $R^1$ is independently a $C_{1-10}$ alkyl group.

Further preferred complexes of use in the invention are of formula (IV') or (IV):

M is zirconium or hafnium;

each X is a sigma ligand, preferably each X is independently a hydrogen atom, a halogen atom, $C_{1-6}$-alkoxy group, $C_{1-6}$-alkyl, phenyl or benzyl group;

each R' is independently a hydrogen atom, $C_{1-20}$ alkyl or $C_{3-7}$ cycloalkyl;

$R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0, 1 to 2; and each $R^1$ is independently a $C_{3-8}$ alkyl group.

Most especially, the complex of use in the invention is of formula (V') or (V):

(V')

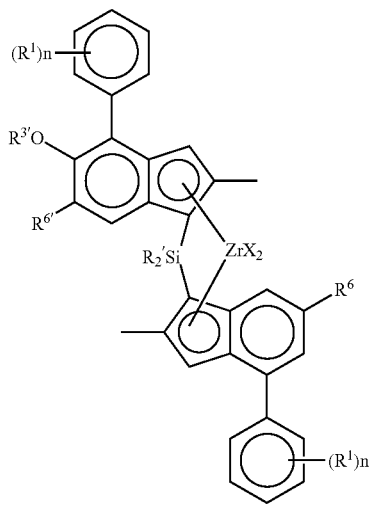

(V)

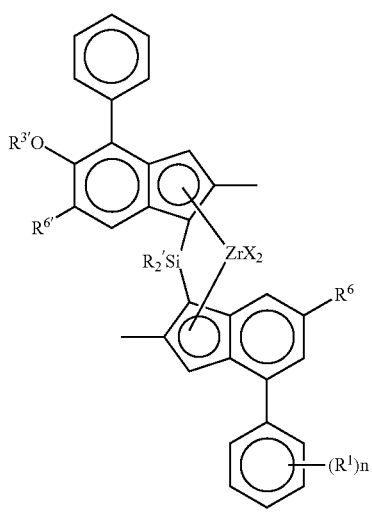

wherein each X is a sigma ligand, preferably each X is independently a hydrogen atom, a halogen atom, $C_{1-6}$-alkoxy group, $C_{1-6}$-alkyl, phenyl or benzyl group;

R' is independently a $C_{1-6}$ alkyl or $C_{3-10}$ cycloalkyl;

$R^1$ is independently $C_{3-8}$ alkyl;

$R^6$ is hydrogen or a $C_{3-8}$ alkyl group;

$R^{6'}$ is a $C_{3-8}$ alkyl group or $C_{6-10}$ aryl group;

$R^{3'}$ is a $C_{1-6}$ alkyl group, or $C_{6-10}$ aryl group optionally substituted by one or more halo groups; and n is independently 0, 1 or 2.

Particular compounds of the invention include:

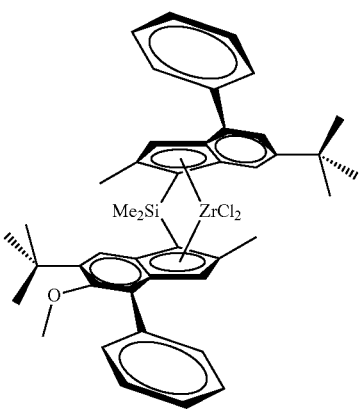

rac-anti-Me$_2$Si(2-Me-4-Ph-6-tBu-Ind)(2-Me-4-Ph-5-OMe-6-tBu-Ind)ZrCl$_2$

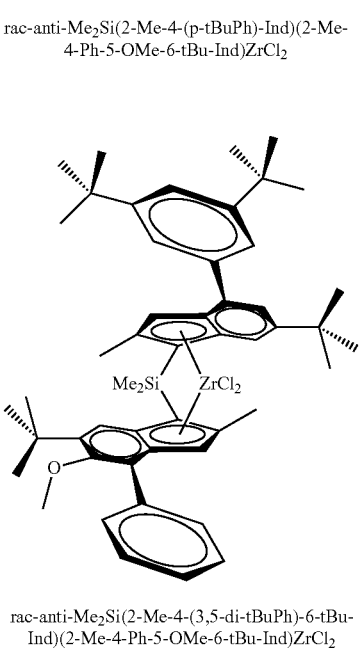

rac-anti-Me$_2$Si(2-Me-4-(p-tBuPh)-Ind)(2-Me-4-Ph-5-OMe-6-tBu-Ind)ZrCl$_2$ rac-anti-Me$_2$Si(2-Me-4-(3,5-di-tBuPh)-6-tBu-Ind)(2-Me-4-Ph-5-OMe-6-tBu-Ind)ZrCl$_2$ -continued
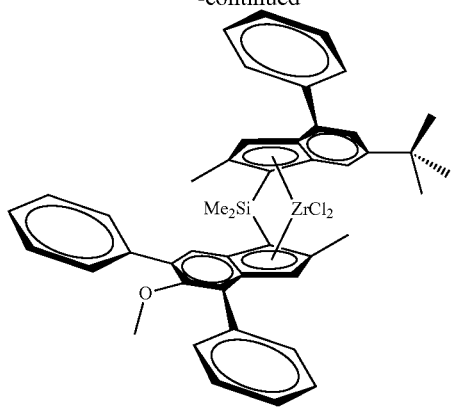
rac-anti-Me₂Si(2-Me-4-Ph-6-tBu-Ind)(2-Me-4,6-di-Ph-5-OMe-Ind)ZrCl₂
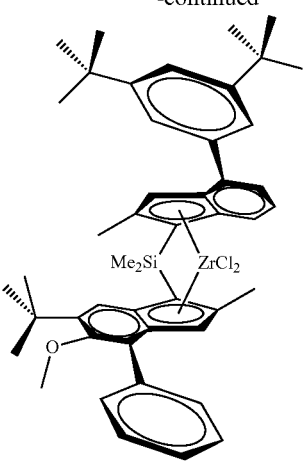
rac-anti-Me₂Si(2-Me-4-(3,5-di-tBuPh)-7-Me-Ind)(2-Me-4-Ph-5-OMe-6-tBu-Ind)ZrCl₂
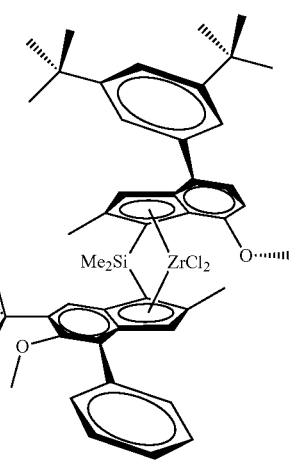
rac-anti-Me₂Si(2-Me-4-(3,5-di-tBuPh)-7-OMe-Ind)(2-Me-4-Ph-5-OMe-6-tBu-Ind)ZrCl₂
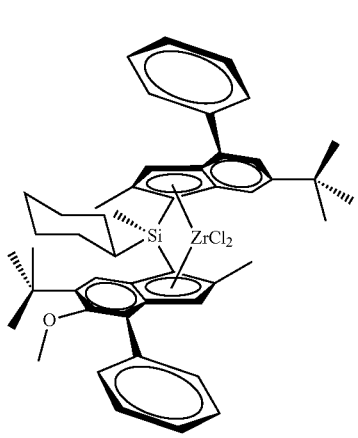
rac-anti-Me₂Si(2-Me-4-(p-tBuPh)-Ind)(2-Me-4-Ph-5-OC₆F₅)-6-iPr-Ind)ZrCl₄
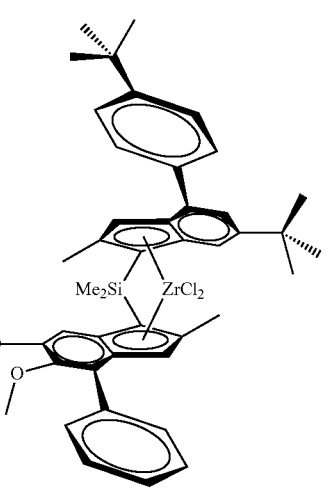
rac-anti-Me(CyHex)Si(2-Me-4-Ph-6-tBu-Ind)(2-Me-4-Ph-5-OMe-6-tBu-Ind)ZrCl₂
rac-anti-Me₂Si(2-Me-4-(p-tBuPh)-6-tBu-Ind)(2-Me-4-Ph-5-OMe-6-tBu-Ind)ZrCl₂

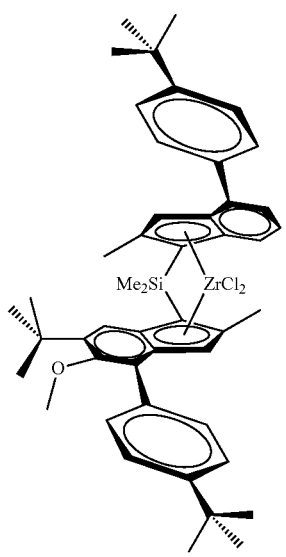

rac-anti-Me$_2$Si(2-Me-4-(p-tBuPh)-Ind)(2-Me-4-(4-tBuPh)-5-OMe-6-tBu-Ind)ZrCl$_2$

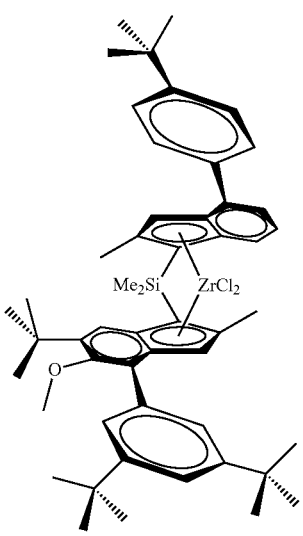

rac-anti-Me$_2$Si(2-Me-4-(p-tBuPh)-Ind)(2-Me-4-(3,5-tBu2Ph)-5-OMe-6-tBu-Ind)ZrCl$_2$ rac-anti-Me$_2$Si(2-Me-4-(p-tBuPh)-Ind)(2-Me-4-Ph-5-OiBu-6-tBu-Ind)ZrCl$_2$ The synthesis of these materials is discussed in WO2013/007650.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention. Thus the cocatalyst is preferably an alumoxane, like MAO. Borate cocatalysts can also be employed. The use of B(C$_6$F$_5$)$_3$, C$_6$H$_5$N(CH$_3$)$_2$H:B(C$_6$F$_5$)$_4$, (C$_6$H$_5$)$_3$C:B(C$_6$F$_5$)$_4$ or Ni(CN)$_4$[B(C$_6$F$_5$)$_3$]$_4^{2-}$ is especially preferred. Suitable cocatalysts are described in WO2013/007650.

Suitable amounts of cocatalyst will be well known to the skilled man.

Manufacture

The catalyst used to manufacture the heterophasic copolymers of the invention is ideally provided in solid particulate form but unsupported, i.e. no external carrier is used. In order to provide the catalyst of the invention in solid form but without using an external carrier, it is preferred if a liquid liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained. WO2013/007650 again contains comprehensive details of this process.

Catalyst Prepolymerisation

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerise" the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After the catalyst prepolymerisation step, a solid catalyst is obtained and used in polymerisation.

Catalyst "prepolymerisation" takes place following the solidification step of the liquid-liquid emulsion process hereinbefore described. Prepolymerisation may take place by known methods described in the art, such as that described in WO 2010/052263, WO 2010/052260 or WO 2010/052264. Preferable embodiments of this aspect of the invention are described herein.

As monomers in the catalyst prepolymerisation step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene. The catalyst prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per)fluorinated hydrocarbons is typically in the range of 0 to 140° C., preferably 30 to 120° C., like 50 to 110° C.

Where the catalyst prepolymerisation is done in fluorinated hydrocarbons, the temperature for the prepolymerisation step is below 70° C., e.g. in the range of −30 to 70° C., preferably 0-65° C. and more preferably in the range 20 to 55° C.

Pressure within the prepolymerisation vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerisation vessel is preferably kept in an inert atmosphere, such as under nitrogen or argon or similar atmosphere.

Prepolymeristaion is continued until the prepolymerisation degree defined as weight of polymer matrix/weight of solid catalyst before prepolymerisation step is reached. The degree is below 25, preferably 0,5 to 10.0, more preferably 1.0 to 8.0, most preferably 2,0 to 6,0.

Use of the catalyst prepolymerisation step offers the advantage of minimising leaching of catalyst components and thus local overheating.

After prepolymerisation, the catalyst can be isolated and stored.

Polymerisation

The polymers of the invention can be prepared by blending the necessary components that have been formed separately. However, the polymers are typically (and preferably) made in a multistep process well known in the art. A preferred multistage process is a "loop-gas phase"-process, such as developed by Borealis A/S, Denmark (known as BORSTAR(R) technology) described e.g. in patent literature, such as in EP-A-0887379 or in WO 92/12182.

The invention preferably relates to the copolymerisation of propylene and ethylene in at least a two step process so as to form a heterophasic propylene ethylene copolymer. Such a polymer may also be known as an impact copolymer.

Polymerization in the method of the invention may be effected in two or more, e.g. 2 or 3, polymerization reactors. The process may also involve a prepolymerisation reaction. This prepolymerisation step is a conventional step used routinely in polymer synthesis and is to be distinguished from the catalyst prepolymerisation step discussed above.

Ideally, the process of the invention employs three main reactors, a first reactor operating in bulk, a first gas phase reactor and a second gas phase reactor. The process may also utilise a prepolymerisation step.

The inventive process of the invention can form a heterophasic propylene ethylene copolymer. In that polymer, it is preferred if the first comoponent, the matrix component is a homopolymer and is subsequently combined with a copolymeric amorphous fraction to form the heterophasic copolymer of the invention. The amorphous fraction is preferably formed second and is preferably formed in the gas phase.

Ideally therefore a propylene homopolymer matrix is formed in a bulk step and a first gas phase step, and a propylene ethylene copolymer amorphous phase formed in the second gas phase step.

For bulk and gas phase copolymerisation reactions, the reaction temperature used will generally be in the range 60 to 115° C. (e.g. 70 to 110° C.), the reactor pressure will generally be in the range 10 to 35 bar for gas phase reactions with bulk polymerisation operating at slightly higher pressures. The residence time will generally be 0.25 to 8 hours (e.g. 0,5 to 4 hours). The gas used will be the monomer optionally as mixture with a non-reactive gas such as nitrogen or propane. It is a particular feature of the invention that polymerisation takes place at temperatures of at least 60° C.

For solution polymerization, an aliphatic or aromatic solvent can be used to dissolve the monomer and the polymer, and the polymerization temperature will generally be in the range 80 to 200° C. (e.g. 90 to 150° C.).

Generally the quantity of catalyst used will depend upon the nature of the catalyst, the reactor types and conditions and the properties desired for the polymer product. As is well known in the art hydrogen can be used for controlling the molecular weight of the polymer.

Heterophasic copolymers can be prepared with the catalysts of the invention and the activity of this catalyst in both liquid and gas phase is much better than that obtained with a standard metallocenes. The higher activity in bulk and gas phase makes those of the invention the preferred catalyst.

In general therefore the catalysts of use in the manufacture of the polymers of the invention can provide:
high activity in bulk propylene polymerisation;
improved ethylene incorporation in propylene copolymers;

high activity obtained in C2/C3 copolymerization in gas phase;
good polymer morphology.

The heterophasic polypropylene resin of the invention can be used in the manufacture of an article such as a flexible pipe/tube, profile, cable insulation, sheet or film. These articles are useful in the medical and general packaging area but also for technical purposes like electrical power cables or geomembranes. Alternatively, the heterophasic polypropylene resin can be used in impact modification of a composition for injection moulding of articles, such as for technical applications in the automotive area.

For impact modification, between 5 and 50 wt % of the inventive heterophasic polypropylene resin will be added to another polypropylene resin having a significantly higher MFR than the inventive heterophasic polypropylene resin.

Thus, the invention also relates to polymer blends comprising the heterophasic polypropylene resins of the invention, in particular blends of it with other propylene polymers. The heterophasic polypropylene copolymer of the invention may form 5 to 50 wt % of such a blend, such as 10 to 40 wt %, in particular 15 to 30 wt % of such a blend.

The heterophasic polypropylene copolymer might be mixed with a polypropylene having a higher $MFR_2$, such as at least 10 g/10 min. In particular, it can be mixed with polypropylenes used in car parts. Such polypropylenes may be homopolymers. Preferably they will not be other elastomeric polymers like another EPR.

The polymers of the invention are useful in the manufacture of a variety of end articles such as films (cast, blown or BOPP films), moulded articles (e.g. injection moulded, blow moulded, rotomoulded articles), extrusion coatings and so on. Preferably, articles comprising the films of the invention are used in packaging. Packaging of interest include heavy duty sacks, hygiene films, lamination films, and soft packaging films.

Due to their excellent low temperature properties, films of the invention are ideal for use in frozen packaging.

The invention will now be illustrated by reference to the following non-limiting examples.

Measurement methods:

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. and may be determined at different loadings such as 2.16 kg (MFR2) or 21.6 kg (MFR21).

The MFR of the XS fraction can also be calculated from the intrinsic viscosity (IV) of said fraction using the correlations defined in C. Grein, M. Gahleitner, B. Knogler & S. Nestelberger, Melt viscosity effects in Ethylene-Propylene Copolymers, Rheol.Acta, 46 (2007) 1083-1089. From the MFR of the total polymer and the MFR of the XS fraction, the MFR of the matrix component of an impact copolymer can be calculated using a logarithmic mixing rule, i.e. assuming the validity of the following equation:

$$MFR(Total) = 10^{(1-w(EPR))log10(MFR(Matrix))+w(EPR)log10(MFR(XCS))}$$

with w(EPR) being the weight fraction of the elastomeric phase, approximated by the weight fraction of the XS.

Intrinsic viscosity is measured according to DIN ISO 1628/1 and /3, October 1999 (in Decalin at 135° C.). The intrinsic viscosity (IV) value increases with the molecular weight of a polymer.

GPC: Molecular weight averages, molecular weight distribution, and polydispersity index (Mn, Mw, Mw/Mn)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2×GMHXL-HT and 1× G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized TCB (same as mobile phase) and keeping for max. 3 hours at max. 160° C. with continuous gentle shaking prior sampling into the GPC instrument.

Determination of xylene soluble fraction (XS):

The xylene soluble fraction (XS) as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XS\% = (100 \times m1 \times v0)/(m0 \times v1),$$

wherein m0 designates the initial polymer amount (grams), m1 defines the weight of residue (grams), v0 defines the initial volume (milliliter) and v1 defines the volume of the analysed sample (milliliter).

Ethylene content (FTIR C2)

Ethylene content was measured with Fourier transform infrared spectroscopy (FTIR) calibrated to results obtained by 13C NMR spectroscopy using a method which accounts for regio-irregular propene insertion. When measuring the ethylene content in polypropylene, a thin film of the sample (thickness about 0.220 to 0.250 mm) was prepared by hotpressing at 230° C. (preheat 5 min., press 1 min., cooling (cold water) 5 min.) using a Graseby Specac press. The FTIR spectra of the sample was recorded immediately with Nicolet Protégé 460 spectrometer from 4000 to 400 cm-1, resolution 4 cm-1, scans 64. The area of absorption peak at 733 cm-1 (baseline from 700 cm-1 to 760 cm-1) and height of reference peak at 809 cm-1 (baseline from 780 cm-1 to 880 cm-1) were evaluated. The result was calculated using the following formula $$Etot = a \times A/R + b$$

where
A=area of absorption peak at 733 cm-1
R=height of reference peak at 809 cm-1
Etot=C2 content (wt.-%)

a, b are calibration constants determined by correlation of multiple calibration standards of know ethylene content as determined by 13C NMR spectroscopy to A/R.

The result was reported as an average of two measurements.

Glass transition temperatures—DMTA

The dynamic-mechanical analysis (DMTA) data are obtained according to ISO 6721-1 (General principles) & 6721-7 (Torsional vibration—Non-resonance method).

Experimental Setup:

A Rheometric scientific ARES rheometer, equipped with a liquid nitrogen unit and an oven (convection and radiation heating), a standard torsion rectangular tool and a software orchestrator V6.5.8, or Anton Paar MCR301 rheometer with a TC30 temperature control unit combined with a liquid nitrogen unit and an CTD600 oven (convection and radiation heating) a standard torsion rectangular tool and a software RHEOPLUS/32 v3.40 are used.

Sample preparation

Stabilized dry pellets are compression molded at 210° C. (gel time 5 min, pressure time 25 bar/3 min, cooling rate 25 bar/15K/min, de-molding temperature 40° C.) in a 100*100*1 mm mould. Only from homogeneous, bubble free plates are punched to 40×10×1 mm$^3$ stripes and are conditioned at least 96 hours at room temperature.

Conducting the experiment:

The device is cooled with the clamped sample to the initial temperature (standard −130° C.). After 5 min delay time the experiment is started with a test frequency of 1 Hz, a heating rate of 2K/min and a strain γ of 0.1%.

The measurements are carried out under inert atmosphere (nitrogen) and a tension (vertically) force of 50 g(+/−20 g).

Temperature dependence of storage modulus G', loss modulus G", and loss angle tangent tan(δ) are used for evaluations.

Determinations of transition sections (e.g. glass transition temperature, Tg) is based on the loss tangent tan(δ) vs. temperature curve (peak of the curve).

Charpy Notched Impact Strength

Charpy impact strength was determined according to ISO 179-1eA:2000 on V-notched samples of 80×10×4 mm$^3$ at 23° C. (Charpy impact strength (23° C.)) and −19° C. (Charpy impact strength (−19° C.)). A standard impact velocity of 2.9 m/s was used.

The test specimens having a dimension of 80×10×4 mm$^3$ were cut from the central part of ISO multibar specimens prepared by injection moulding in line with ISO 1873-2.

Brittle-to-ductile transition temperature

The determination of the brittle-to-ductile transition temperature (BDTT) is based on the a(cN) values as determined from Charpy instrumented impact strength according to ISO 179-2:2000 on V-notched specimen with a geometry of 80×10×4 mm3 as required in ISO 179-1eA.

The a(cN) values are determined in intervals of 3° C. from −40° C. to +41° C. with an impact velocity of 1.5 m/s and plotted over temperature, calculating the BDTT as the average value of the step increase. For a detailed description of the determination of the BDTT reference is made to Grein, C. et al, Impact Modified Isotactic Polypropylene with Controlled Rubber Intrinsic Viscosities: Some New Aspects About Morphology and Fracture, J Appl Polymer Sci, 87 (2003), 1702-1712.

Tensile Modulus and Strain at Break

Tensile properties were determined according to ISO 527-2 (cross head speed=50 mm/min; 23° C.) using injection moulded specimens as described in EN ISO 1873-2 (ISO multibar, dog bone shape, 4 mm thickness).

Prepolymerisation degree Calculated as weight of polymer matrix/weight of solid catalyst before prepolymerisation step.

EXAMPLES

Catalyst preparation:

The catalysts used have been prepared following the general procedures described in WO2013/007650 to prepare catalyst E2 and E2P, using the same metallocene complex (E2 in WO13/007650) rac-anti-dimethylsilanediyl(2-methyl-4-(4'-tert-butylphenyeinden-1-yl)(2-methyl-4-phenyl-5-methoxy-6-tert-butylinden-1-yl) zirconium dichloride.

Their composition is indicated below:

| Catalyst | Al/Zr (molar ratio) in unprepped catalyst Mol/mol | Metallocene in unprepped catalyst wt % | Degree of prepping w/w | Used in examples # |
|---|---|---|---|---|
| 1 | 242 | 5.21 | 3.2 | Ex1, Ex2, Ex4, Ex6 |
| 2 | 250 | 5.05 | 3.5 | Ex5 |
| 3 | 253 | 4.99 | 2.7 | Ex3, CE1, CE2, CE4 |
| 4 | 253 | 4.99 | 3.4 | CE3 |

The procedures are described in detail below:

Catalyst 1

Catalyst synthesis: Inside the glovebox, 80.0 µl of dry and degassed FluorN 474 were mixed with 2 mL of MAO in a septum bottle and left to react overnight. The following day, 58.7 mg of the metallocene (0,076 mmol, 1 equivalent) were dissolved with 4 mL of the MAO solution in another septum bottle and left to stir inside the glovebox. After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.60 g of a red solid catalyst was obtained.

Catalyst off-line prepolymerization (Prepping): The above catalyst was pre-polymerised according to the following procedure: Off-line pre-polymerisation experiment was done in a 125 mL pressure reactor equipped with gas-feeding lines and an overhead stirrer. Dry and degassed perfluoro-1.3-dimethylcyclohexane (15 cm$^3$) and 557.3 mg of the catalyst to be pre-polymerised were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The propylene feed was left open and the monomer consumption was compensated by keeping the total pressure in the reactor constant (about 5 barg). The experiment was continued until a polymerisation time (14 min.) sufficient to provide the desired degree of polymerisation (DP=3.2). The reaction was stopped by flashing the volatile components. Inside the glove box, the reactor was opened and the content poured into a glass vessel. The perfluoro-1.3-dimethylcyclohexane was evaporated until a constant weight was obtained to yield 2.33 g of the pre-polymerised catalyst.

Catalyst 2

Catalyst synthesis: Inside the glovebox, 80.0 µl of dry and degassed FluorN 474 were mixed with 2 mL of MAO in a septum bottle and left to react overnight. The following day, 58.7 mg of the metallocene (0,076 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C. /600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.81 g of a red solid catalyst was obtained.

Catalyst off-line prepolymerization (Prepping): The above catalyst was pre-polymerised according to the following procedure: Off-line pre-polymerisation experiment was done in a 125 mL pressure reactor equipped with gas-feeding lines and an overhead stirrer. Dry and degassed perfluoro-1.3-dimethylcyclohexane (15 cm$^3$) and 801.7 mg of the catalyst to be pre-polymerised were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The propylene feed was left open and the monomer consumption was compensated by keeping the total pressure in the reactor constant (about 5 barg). The experiment was continued until a polymerisation time (17 min.) sufficient to provide the desired degree of polymerisation (DP=3.5). The reaction was stopped by flashing the volatile components. Inside the glove box, the reactor was opened and the content poured into a glass vessel. The perfluoro-1.3-dimethylcyclohexane was evaporated until a constant weight was obtained to yield 3.59 g of the pre-polymerised catalyst.

Catalyst 3

Catalyst synthesis: Inside the glovebox, 80.0 µl of dry and degassed FluorN 474 were mixed with 2 mL of MAO in a septum bottle and left to react overnight. The following day, 58.7 mg of the metallocene (0,076 mmol, 1 equivalent) were dissolved with 4 mL of the MAO solution in another septum bottle and left to stir inside the glovebox. After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.71 g of a red solid catalyst was obtained.

Catalyst off-line prepolymerization (Prepping): The above catalyst was pre-polymerised according to the following procedure: Off-line pre-polymerisation experiment was done in a 125 mL pressure reactor equipped with gas-feeding lines and an overhead stirrer. Dry and degassed perfluoro-1.3-dimethylcyclohexane (15 cm$^3$) and 668.5 mg of the catalyst to be pre-polymerised were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The propylene feed was left open and the monomer consumption was compensated by keeping the total pressure in the reactor constant (about 5 barg). The experiment was continued until a polymerisation time (13 min.) sufficient to provide the desired degree of polymerisation (DP=2.7). The reaction was stopped by flashing the volatile components. Inside glove box, the reactor was opened and the content poured into a glass vessel. The perfluoro-1.3-dimethylcyclohexane was evaporated until a constant weight was obtained to yield 2.50 g of the pre-polymerised catalyst.

Catalyst 4 was prepared in the same way as catalyst 3, but reaching a higher degree of polymerisation (DP=2.7).

Comparative example 5 is the commercial product Borsoft SD233CF available from Borealis AG being a random-heterophasic ethylene-propylene copolymer.

Polymerization examples: bulk propylene homopolymerization followed by gas phase ethylene/propylene copolymerization The heterophasic compositions have been prepared by means of either a 2 step polymerisation (bulk homopolymerisation+gas phase (GP) C2/C3 copolymerisation) or a 3-step polymerization (bulk homopolymerisation+gas phase (GP1) homopolymerisation+gas phase (GP2) C2/C3 copolymerisation) in a 20-L reactor, as described below.

Example CE4

Step 1: Bulk propylene homopolymerization

A stirred autoclave (double helix stirrer) with a volume of 21.2 dm$^3$ containing 0.2 bar-g propylene, was filled with additional 3.97 kg propylene plus the amount of H2 indicated in the table. After adding 0.73 mmol triethylaluminium (Aldrich, 1 molar solution in n-hexane) using a stream of 250 g propylene, the solution was stirred at 20° C. and 250 rpm for 20 min. Then the catalyst was injected as described in the following. The solid, pre-polymerized catalyst (type, amount and degree of polymerisation as listed in the tables) was loaded into a 5-mL stainless steel vial inside the glovebox, the vial was attached to the autoclave, then a second 5-mL vial containing 5 ml perfluorodimethylcyclohexane and pressurized with 60 bars of N2 was added on top, the valve between the two vials was opened and the solid catalyst was contacted with hexane under N2 pressure for 2 s, then flushed into the reactor with 250 g propylene. Stirring speed was increased to 250 rpm and pre-polymerisation was run for 10 min at 20° C. At the end of the prepolymerization step, the stirring speed was increased to 350 rpm and the polymerisation temperature increased to 80° C. When the internal reactor temperature reached 71° C., the amount of H2 indicated in the table was added with a defined flow via thermal mass flow controller. The reactor temperature was held constant throughout the polymerization. The polymerization time was measured starting when the temperature was 2° C. below the set polymerization temperature.

Step 2: Gas Phase ethylene/propylene copolymerization

When the bulk step was finished, the stirrer speed was reduced to 50 rpm. The reactor pressure was lowered to 0.3 bar by venting, and the temperature and control device was set to 80° C.

Afterwards the stirrer speed was adjusted to 250 rpm. Then the reactor was filled with the chosen C3/C2 monomer ratio (transition feed, see table). The speed of the reactor filling during the transition was limited by the max. flow of the gas flow controllers. When the reactor temperature reached 79° C. and the reactor pressure reached the set value, the composition of the fed C3/C2 mixture was changed to the target copolymer composition and temperature and pressure were held constant until the amount of C3/C2 gas mixture required to reach the target rubber split had been consumed.

The reaction was stopped by setting the stirrer speed to 20 rpm, cooling the reactor to 30° C. and flashing the volatile components.

After flushing the reactor twice with N2 and one vacuum/N2 cycle, the product was taken out and dried overnight in a fume hood. 100 g of the polymer was additivated with 0.2 wt % Ionol and 0.1 wt % PEPQ (dissolved in acetone) and then dried overnight in a hood plus 2 hours in a vacuum drying oven at 60° C.

Example CE3

Step 1: Bulk propylene homopolymerization

A stirred autoclave (double helix stirrer) with a volume of 21.2 dm$^3$ containing 0.2 bar-g propylene, was filled with additional 3.97 kg propylene plus the amount of H2 indicated in the table. After adding 0.73 mmol triethylaluminium (Aldrich, 1 molar solution in n-hexane) using a stream of 250 g propylene, the solution was stirred at 20° C. and 250 rpm for 20 min. Then the catalyst was injected as described in the following. The solid, pre-polymerized catalyst (type, amount and degree of polymerisation as listed in the tables) was loaded into a 5-mL stainless steel vial inside the glovebox, the vial was attached to the autoclave, then a second 5-mL vial containing 4 ml n-hexane and pressurized with 10 bars of N2 was added on top, the valve between the two vials was opened and the solid catalyst was contacted with hexane under N2 pressure for 2 s, then flushed into the reactor with 250 g propylene. Stirring speed was increased to 250 rpm and pre-polymerisation was run for 10 min at 20° C. At the end of the prepolymerization step, the stirring speed was increased to 350 rpm and the polymerisation temperature increased to 80° C. When the internal reactor temperature reached 71° C., the amount of H2 indicated in the table was added with a defined flow via thermal mass flow controller. The reactor temperature was held constant throughout the polymerization. The polymerization time was measured starting when the temperature was 2° C. below the set polymerization temperature.

Step 2: Gas Phase: ethylene/propylene copolymerization

After the bulk step was finished, the stirrer speed was reduced to 50 rpm. The reactor pressure was lowered to 0.3 bar by venting, and the temperature and control device was set to 70° C.

Afterwards the stirrer speed was adjusted to 250 rpm. Then the reactor was filled with the chosen C3/C2 monomer ratio (transition feed, see table). The speed of the reactor filling during the transition was limited by the max. flow of the gas flow controllers. When the reactor temperature reached 69° C. and the reactor pressure reached the set value, the composition of the fed C3/C2 mixture was changed to the target copolymer composition and temperature and pressure were held constant until the amount of C3/C2 gas mixture required to reach the target rubber split had been consumed.

The reaction was stopped by setting the stirrer speed to 20 rpm, cooling the reactor to 30° C. and flashing the volatile components.

After flushing the reactor twice with N2 and one vacuum/N2 cycle, the product was taken out and dried overnight in a fume hood. 100 g of the polymer was additivated with 0.2 wt % Ionol and 0.1 wt % PEPQ (dissolved in acetone) and then dried overnight in a hood plus 2 hours in a vacuum drying oven at 60° C.

Example CE1

Step 1: Bulk propylene homopolymerization
Same procedure as Example CE3

Step 2: Gas Phase; propylene homopolymerization (GP1)

After the bulk step was finished, the stirrer speed was adjusted to 50 rpm and the reactor pressure was reduced to 0.5 bar below the set pressure by venting. Afterwards the stirrer speed was set to 250 rpm, the reactor temperature to 80° C. and the amount of H2 indicated in the table was dosed via MFC. Then the reactor P and T were held constant by propylene feed, via MFC, until the target split had been reached.

The reaction was stopped by setting the stirrer speed to 20 rpm, cooling the reactor to 30° C. and flashing the volatile components.

After flushing the reactor twice with N2 and one vacuum/N2 cycle, the product was taken out and dried overnight in a fume hood. 100 g of the polymer was additivated with 0.2 wt % Ionol and 0.1 wt % PEPQ (dissolved in acetone) and then dried overnight in a hood plus 2 hours in a vacuum drying oven at 60° C.

Example CE2 and Example 3

Step 1: Bulk propylene homopolymerization
Same procedure as Example CE3

Step 2: Gas Phase:propylene homopolymerization (GP1)

After the bulk step had finished, the stirrer speed was adjusted to 50 rpm and the reactor pressure was reduced to 0.5 bar below the set pressure by venting. Following the stirrer speed was set to 250 rpm, the reactor temperature to 80° C. and the amount of H2 indicated in the table was dosed via MFC. Then the reactor P and T were held constant by propylene feed via MFC until the target split had been reached.

Step 3: Gas Phase: ethylene/propylene copolymerization (GP2)

When GP1 had been finished, the stirrer speed was reduced to 50 rpm and the reactor pressure to 0.3 barg by venting. In addition the temperature control device settings were changed to 70° C.

Afterwards the stirrer speed was adjusted to 250 rpm. Then the reactor had been filled with the chosen C3/C2 monomer ratio (transition feed, see table). The speed of the reactor filling during the transition was limited by the max.

flow of the gas flow controllers. When the reactor temperature reached 69° C. and the reactor pressure reached the set value, the composition of the fed C3/C2 mixture was changed to the target copolymer composition and temperature and pressure were held constant until the amount of C3/C2 gas mixture required to reach the target rubber split had been consumed.

The reaction was stopped by setting the stirrer speed to 20 rpm, cooling the reactor to 30° C. and flashing the volatile components.

After flushing the reactor twice with N2 and one vacuum/N2 cycle, the product was taken out and dried overnight in a fume hood. 100 g of the polymer was additivated with 0.2 wt % Ionol and 0.1 wt % PEPQ (dissolved in acetone) and then dried overnight in a hood plus 2 hours in a vacuum drying oven at 60° C.

Example 1, Example 6, Example 4, Example 2, Example 5

Step 1: Bulk propylene homopolymerization
Same procedure as Ex CE3
Step 2: Gas Phase: propylene homopolymerization (GP1)

After the bulk step was finished, the stirrer speed was adjusted to 50 rpm and the reactor pressure was reduced to 0.5 bar below the set pressure by venting. Then the stirrer speed was set to 250 rpm, the reactor temperature to 80° C. and the amount of H2 indicated in the table was dosed via MFC. Then the reactor P and T were held constant by propylene feed via MFC until the target split had been reached.

Step 3: Gas Phase: ethylene/propylene copolymerization (GP2)

When the GP1 had been finished, the stirrer speed was reduced to 50 rpm. The reactor pressure was lowered to 0.3 barg by venting, the temperature and control device was set to 70° C. Then the reactor was filled with 200 g propylene at a flow of 70 g/min and flushed again to 0.3 barg.

Afterwards the stirrer speed was adjusted to 250 rpm. Then the reactor was filled with the chosen C3/C2 monomer ratio (transition feed, see table). The speed of the reactor filling during the transition was limited by the max. flow of the gas flow controllers. When the reactor temperature reached 69° C. and the reactor pressure reached the set value, the composition of the fed C3/C2 mixture was changed to the target copolymer composition and temperature and pressure were held constant until the amount of C3/C2 gas mixture required to reach the target rubber split had been consumed.

The reaction was stopped by setting the stirrer speed to 20 rpm, cooling the reactor to 30° C. and flashing the volatile components.

After flushing the reactor twice with N2 and one vacuum/N2 cycle, the product was taken out and dried overnight in a fume hood. 100 g of the polymer was additivated with 0.2 wt % Ionol and 0.1 wt % PEPQ (dissolved in acetone) and then dried overnight in a hood plus 2 hours in a vacuum drying oven at 60° C.

Results are presented in the following tables 2 and 3:

TABLE 2

| | | prepolymerized | | | | | PREPOLY | | | BULK STEP |
|---|---|---|---|---|---|---|---|---|---|---|
| Example | catalyst | prep degree w/w | catalyst amount mg | cat. diluent Type | diluent amount Ml | TEA1 (1 molar) ml | T ° C. | res. time min | H2 NL | temp. av. bulk ° C. |
| Ex1 | 1 | 3.2 | 227 | * | 4 | 0.73 | 20 | 10 | 0.0 | 80 |
| Ex2 | 1 | 3.2 | 171 | * | 4 | 0.73 | 20 | 10 | 0.0 | 80 |
| Ex3 | 3 | 2.7 | 200 | * | 4 | 0.73 | 20 | 10 | 0.0 | 80 |
| Ex4 | 1 | 3.2 | 175 | * | 4 | 0.73 | 20 | 10 | 0.0 | 80 |
| Ex5 | 2 | 3.5 | 193 | * | 4 | 0.73 | 20 | 10 | 0.0 | 80 |
| Ex6 | 1 | 3.2 | 175 | * | 4 | 0.73 | 20 | 10 | 0.0 | 80 |
| CE1 | 3 | 2.7 | 200 | * | 4 | 0.73 | 20 | 10 | 0.0 | 80 |
| CE2 | 3 | 2.7 | 200 | * | 4 | 0.73 | 20 | 10 | 0.0 | 80 |
| CE3 | 4 | 3.4 | 142 | * | 4 | 0.73 | 20 | 10 | 0.4 | 80 |
| CE4 | 3 | 2.7 | 120 | ** | 5 | 0.73 | 20 | 10 | 0.4 | 80 |

| | BULK STEP | | | GP1 (homopolymerisation) | | | | | GP C3H6 |
|---|---|---|---|---|---|---|---|---|---|
| Example | total H2 NL | H2 dosing rate NL/min | res. time min | Temp. ° C. | Ptotal Bar-g | H2 NL | H2-dosing rate mln/min | time min | feed (MFC) g |
| Ex1 | 4 | 1.8 | 30 | 80 | 28.7 | 1.479 | 1479 | 68.8 | 1000 |
| Ex2 | 5 | 1.8 | 20 | 80 | 29.6 | 1.48 | 1480 | 41.2 | 608 |
| Ex3 | 4 | 1.8 | 20 | 80 | 29.8 | 1.479 | 1479 | 60 | 600 |
| Ex4 | 5 | 1.8 | 20 | 80 | 30 | 1.911 | 1911 | 40.2 | 208 |
| Ex5 | 4 | 1.8 | 20 | 80 | 25 | 1.1 | 1100 | 46.5 | 425 |
| Ex6 | 4 | 1.8 | 20 | 80 | 29.8 | 1.48 | 1479 | 42 | 485 |
| CE1 | 4 | 1.8 | 30 | 80 | 30 | 1.481 | 1479 | 117 | 1000 |
| CE2 | 4 | 1.8 | 30 | 80 | 29.9 | 1.479 | 1479 | 105.7 | 828 |
| CE3 | 2 | 0.116 | 30 | | | | | | |
| CE4 | 2 | 0.116 | 30 | | | | | | |

TABLE 2-continued

GP(C2/C3)

| | Temp GP °C. | Ptotal Barg | H2 NL | res. time Min | C3H6-feed transition (MFC) G | C2H4-feed transition (MFC) g | feed C2/C3 wt during transition | GP-C3H6 feed (MFC) g | GP-C2H4 feed (MFC) g | feed C2/C3 wt | YIELD yield total g | MFR MFR (2.16) g/10 min |
|---|---|---|---|---|---|---|---|---|---|---|---|---|
| Ex 1 | 70 | 25 | 0 | 207 | 394 | 321 | 0.81 | 600 | 150 | 0.25 | 2877 | 19.5 |
| Ex 2 | 70 | 20 | 0 | 183 | 217 | 300 | 1.38 | 490 | 210 | 0.43 | 1832 | 18.4 |
| Ex 3 | 70 | 25 | 0 | 120 | 260 | 360 | 1.38 | 214 | 83 | 0.39 | 1842 | 25 |
| Ex 4 | 70 | 20 | 0 | 219 | 220 | 304 | 1.38 | 490 | 207 | 0.43 | 1750 | 31 |
| Ex 5 | 70 | 20 | 0 | 105 | 113 | 365 | 3.23 | 214 | 213 | 0.995 | 1420 | 15.2 |
| Ex 6 | 70 | 25 | 0 | 108 | 83 | 501 | 6.04 | 220 | 366 | 1.66 | 1817 | 5.7 |
| CE1 | | | | | | | | | | | 2230 | 34.2 |
| CE2 | 70 | 25 | 0 | 128.5 | 489 | 261 | 0.53 | 164 | 62 | 0.38 | 2300 | 17.3 |
| CE3 | 70 | 25 | 0 | 122 | 511 | 270 | 0.53 | 70 | 31 | 0.44 | 912 | 1 |
| CE4 | 80 | 25 | 0 | 121 | 491 | 261 | 0.53 | 107 | 47 | 0.44 | 963 | 2.2 |

\* = hexane;
\*\* = PFC

TABLE 3

| Example | MFR(Matrix) g/10 min | MFR(total) g/10 min | IV(Matrix) dl/g | IV(XI) dl/g | IV(XS) dl/g | IV(XS)/ IV(M) | XS wt % | C2(XS) wt % | C2(total) wt % | C2(XI) wt % |
|---|---|---|---|---|---|---|---|---|---|---|
| EX1 | 35 | 19.5 | 1.37 | 1.37 | 1.99 | 1.45 | 29.3 | 21.8 | 6.2 | 0.0 |
| EX2 | 35 | 18.4 | 1.37 | 1.37 | 1.69 | 1.23 | 43.4 | 29.2 | 12.7 | 0.0 |
| EX3 | 35 | 25.0 | 1.37 | 1.37 | 1.81 | 1.32 | 30.0 | 4.0 | 0.0 | |
| | | | | | | | | | | |
| EX3 | 35 | 25.0 | 1.37 | 1.37 | 1.81 | 1.32 | 13.7 | 30.0 | 4.0 | 0.0 |
| EX4 | 80 | 31.0 | 1.15 | 1.15 | 1.77 | 1.54 | 40.2 | 30.0 | 12.5 | 0.0 |
| EX5 | 35 | 15.2 | 1.37 | 1.37 | 1.89 | 1.38 | 30.7 | 53.7 | 15.6 | 0.5 |
| EX6 | 35 | 5.7 | 1.37 | 1.37 | 2.65 | 1.93 | 35.5 | 65.1 | 21.8 | 0.0 |
| CE1 | 35 | 35.0 | 1.37 | 1.37 | n.d. | n.d. | 0.1 | 0.0 | 0.0 | 0.0 |
| CE2 | 35 | 17.3 | 1.37 | 1.37 | 2.13 | 1.55 | 11.7 | 16.6 | 1.5 | 0.0 |
| CE3 | 0.8 | 1.0 | 3.00 | 3.00 | 2.10 | 0.70 | 11.9 | 17.4 | 1.9 | 0.0 |
| CE4 | 1.7 | 2.2 | 2.60 | 2.60 | 2.15 | 0.83 | 22.4 | 17.6 | 3.5 | 0.0 |
| CE5 | 8 | 7.0 | 2.30 | 2.30 | 1.70 | 0.74 | 23.0 | 25.0 | 8.0 | 2.9 |

| | BDTT/ °C. | Charpy NIS/ kJ/m²@1.5 m/s | | Tensile test | | DMTA | | |
|---|---|---|---|---|---|---|---|---|
| Example | Tpeak | −19° C. | 23° C. | Modulus/ MPa | Strain at break/% | Tg(EPR)/ °C. | Tg(PP)/ °C. | G'(23° C.)/ MPa |
| EX1 | 8 | 5.5 | 42.0 | 973 | 411 | −42.0 | 2.0 | 504 |
| EX2 | −7 | 10.5 | 46.0 | 946 | 83 | −46.6 | 1.4 | 373 |
| EX3 | 18 | 7.4 | 7.6 | 1348 | 412 | −50.8 | 1.7 | 605 |
| EX4 | 2 | 9.5 | 32.4 | 817 | 243 | −46.6 | 1.2 | 357 |
| EX5 | 26 | 7.8 | 16.6 | 1101 | 304 | −56.0 | 2.1 | 444 |
| EX6 | 5 | 9.7 | 48.9 | 963 | 234 | −52.0 | 2.0 | 530 |
| CE1 | >40 | 1.5 | 2.2 | 1614 | 414 | | 1.8 | 753 |
| CE2 | 37 | 2.1 | 8.0 | 1210 | 387 | −38.0 | 0.0 | 658 |
| CE3 | 29 | 1.6 | 13.6 | 1191 | 294 | −36.0 | 0.0 | 535 |
| CE4 | 8 | 2.1 | 38.7 | 1123 | 310 | −40.0 | 0.0 | 510 |
| CE5 | 35 | 1.9 | 13.4 | 717 | 318 | −50.0 | −6.1 | 325 |

The invention claimed is:

1. A heterophasic propylene ethylene copolymer having an MFR$_2$ of 18.4 g/10 min to 31 g/10 min and obtained using single site catalysis comprising:
   (i) a xylene insoluble fraction consisting of a mixture of different propylene homopolymers, wherein the xylene insoluble fraction is from 56.6 wt % to 70.7 wt % of the heterophasic propylene ethylene copolymer, has a MFR$_2$ of 35 g/10 min to 80 g/10 min, and an intrinsic viscosity of from 1.15 dl/g to 1.37 dl/g; and
   (ii) 29.3 to 43.4 wt % of a xylene cold soluble fraction consisting of a single ethylene propylene rubber dispersed in the xylene insoluble fraction;
   wherein the xylene cold soluble fraction has an intrinsic viscosity of 1.77 dl/g to 1.99 dl/g;
   wherein the ethylene content of the xylene cold soluble fraction (C$_2$(XS)) of said heterophasic propylene ethylene copolymer is between 21.8 wt % and 30 wt %;
   wherein the total ethylene content of the heterophasic propylene ethylene copolymer is from 6.2 wt % to 12.7 wt %, and
   wherein the heterophasic propylene ethylene copolymer has a Charpy notched impact strength at 23° C. of from 32.4 kJ/m² to 46.0 kJ/m².

2. The heterophasic propylene ethylene copolymer as claimed in claim 1 wherein the intrinsic viscosity of the xylene cold soluble fraction divided by the intrinsic viscosity of the xylene insoluble fraction is more than 1.2 to 1.73.

3. A process for the preparation of the heterophasic propylene ethylene copolymer as claimed in claim 1 comprising polymerizing:

(I) propylene so as to form the mixture of different propylene homopolymers to form the xylene insoluble fraction; and subsequently polymerizing (II) propylene and ethylene so as to form the ethylene propylene rubber dispersed in the xylene insoluble fraction;

wherein both steps (I) and (II) take place in the presence of the same single site solid particulate catalyst free from an external carrier.

4. The process of claim 3 in which the catalyst is prepared by obtaining a complex of formula (I) and a cocatalyst (ii);

forming a liquid/liquid emulsion system, which comprises a solution of catalyst components (i) and (ii) dispersed in a solvent, and solidifying said dispersed droplets to form solid particles, wherein the complex of formula (I) has the structure

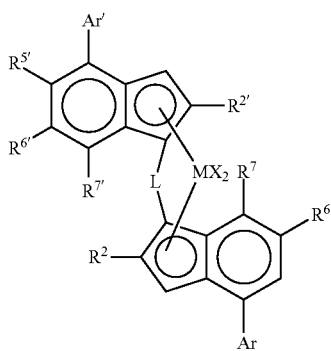

(I)

wherein

M is zirconium or hafnium;

each X is a sigma ligand;

L is a divalent bridge selected from —$R'_2C$—, —$R'_2C$—$CR'_2$—, —$R'_2Si$—, —$R'_2Si$—$SiR'_2$—, —$R'_2Ge$—, wherein each R' is independently a hydrogen atom, $C_1$-$C_{20}$-hydrocarbyl, tri($C_1$-$C_{20}$-alkyl)silyl, $C_6$-$C_{20}$-alkyl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms;

$R^6$ and $R^{6'}$ are each independently hydrogen or a $C_{1-20}$ hydrocarbyl group optionally containing one or more heteroatoms from groups 14-16;

$R^7$ and $R^{7'}$ are each independently hydrogen or $C_{1-20}$ hydrocarbyl group optionally containing one or more heteroatoms from groups 14-16;

Ar is independently an aryl or heteroaryl group having up to 20 carbon atoms optionally substituted by one or more groups $R^1$;

Ar' is independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;

each $R^4$ is a $C_{1-20}$ hydrocarbyl group;

and (ii) a cocatalyst comprising a compound of a group 13 metal, e.g. Al or boron compound.

5. An article comprising the heterophasic propylene ethylene copolymer of claim 1.

6. The article of claim 5, wherein the article is a film.

* * * * *